Dec. 16, 1969   HIROFUMI TAKENAKA   3,484,319
METHOD OF MANUFACTURING A BEADED CLOTH AND BEADED
CLOTH MANUFACTURED THEREBY
Filed Dec. 15, 1965                                     2 Sheets-Sheet 1
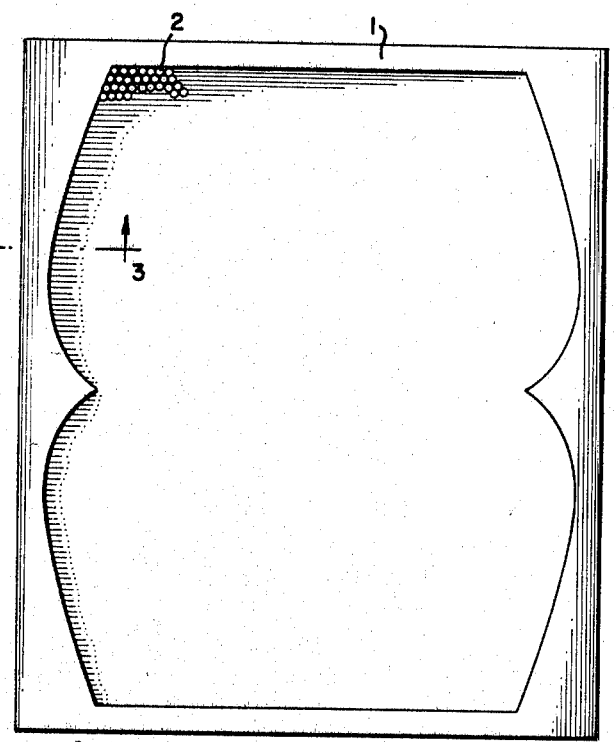
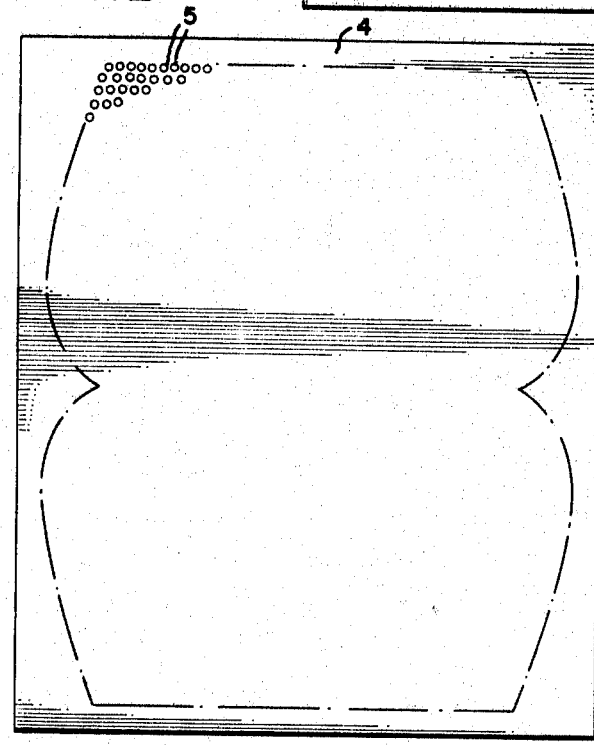
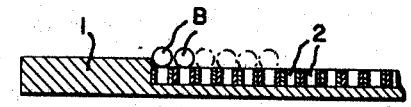
INVENTOR
HIROFUMI TAKENAKA
ATTORNEYS United States Patent Office 3,484,319
Patented Dec. 16, 1969

3,484,319
METHOD OF MANUFACTURING A BEADED CLOTH AND BEADED CLOTH MANUFACTURED THEREBY
Hirofumi Takenaka, 518 Nishiinokuchi, Higashikankicho, Kakogawa, Japan
Filed Dec. 15, 1965, Ser. No. 514,053
Claims priority, application Japan, Dec. 15, 1964, 39/70,862
Int. Cl. B32b 31/12
U.S. Cl. 156—297     5 Claims

ABSTRACT OF THE DISCLOSURE

A method of manufacturing beaded cloth, i.e. a cloth having beads attached thereto, in which a predetermined pattern of beads is first laid out within a holding member, the pattern is transferred to the cloth, an adhesive is then applied to one or both sides of the cloth in the pattern of the beads, and then the beads are attached by applying the cloth, which has the adhesive preapplied thereto, over the patterned beads so that the patterned adhesive coincides with the patterned beads.

---

The present invention relates to a method of manufacturing a beaded cloth, i.e. a cloth having beads thereon, and to a beaded cloth made by said method. More particularly, the invention relates to a method of making such a beaded cloth in which a pattern of beads is first laid out, the pattern is transferred to the cloth, an adhesive is applied to the cloth in the pattern of the beads, and then the beads are applied to the patterned adhesive on the cloth.

Heretofore it has been customary to manufacture beaded cloth by piercing the individual beads, threading a thread through the thus pierced bead, and then sewing the bead on the cloth. It can be seen that such a process is a long and laborious one, especially where the pattern of beads on the cloth requires lots of beads and where a large amount of beaded cloth is required.

It is an object of the present invention to provide a method of manufacturing beaded cloth, and a cloth manufactured thereby, in which the beads are glued on the cloth.

It is a further object of this invention to provide a method of manufacturing beaded cloth, and a beaded cloth manufactured thereby, in which all of the beads in a pattern can be affixed to the cloth at the same time, thereby making mass production of breaded cloth possible.

It is a still further object of the present invention to provide a method of manufacturing beaded cloth, and a beaded cloth manufactured thereby, in which the cloth is soft and flexible, even though the beads are affixed thereto by glue.

Other and further objects of the present invention will become apparent from the following specification and claims, taken together with the accompanying drawings, in which:

FIG. 1 is a plan view of a frame for holding beads to be applied to a cloth by the method of the present invention;

FIG. 2 is a plan view of a perforated plate having perforations in the pattern in which the beads are to be applied to the cloth according to the method of the present invention;

FIG. 3 is an enlarged sectional view taken on line 3—3 of FIG. 1;

Figure 4:
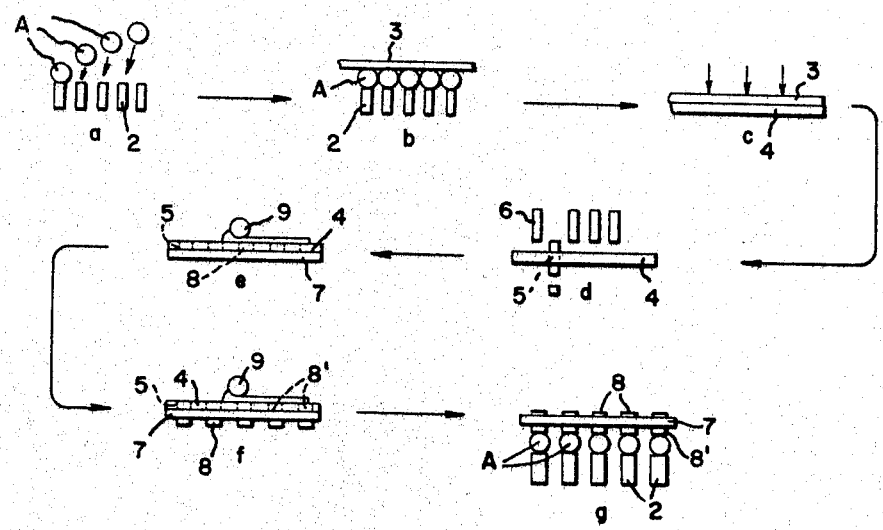
FIG. 4 is a schematic view of the steps of the method of the present invention.

As seen in FIGS. 1-4, the method comprises first preparing a frame 1 which has the interior thereof the same size and shape as the beaded area or areas of the cloth which it is desired to cover with beads, and then setting into the interior of said frame 1 a plurality of pipe sections 2 all having the same height and which are stood on end. These pipe sections 2 are of a size to receive beads A which are to be placed on the cloth and to hold these beads in the ends of the pipe sections 2. After the frame 1 is filled with the pipe sections stood on end, beads A are placed on the pipe sections as seen in FIG. 3. Thereafter, carbon paper 3, or some like transfer material, is placed over the beads A on the pipe sections 2 in the frame 1, and the impressions of the tops B of the beads A is impressed on the transfer material. Then the transfer material 3 is removed from the beads A and pressed against a sheet 4 of substantially rigid material, such as Celluloid, so as to mark on the sheet 4 positions coresponding to the positions of the beads A.

The sheet 4 is then perforated at the positions marked thereon to form a plurality of holes 5, the perforations being formed for example by punches 6 on conventional punching apparatus which is not shown. The thus perforated sheet 4 is then placed over the back face of a cloth 7 to which the beads are to be secured and which has an area at least as large as the area of the inside of the frame 1, and a plurality of spots of adhesive material 8 is applied to the back face of the cloth 7 in the pattern of the beads by spreading the adhesive material over the perforated sheet 4 and forcing it through the holes 5 in the sheet by means of a roller 9 or the like. The back face of the cloth 7 thus has a pattern of spots 8 of the adhesive material thereon in the pattern of the beads to be applied to the cloth.

The adhesive spots 8 on the back face of the cloth 7 are caused to dry, either by simply exposing them to the atmosphere and allowing them to dry naturally or placing them in a heated or other special drying atmosphere, and then the cloth 7 is turned over and the perforated sheet 4 placed against the front face of the cloth with the holes 5 aligned with the spots of adhesive material 8 already on the back face of the cloth, and a plurality of adhesive spots 8' is applied to the front face of the cloth by again spreading the adhesive material over the perforated sheet 4 and forcing it through the holes 5.

Before the adhesive material of the spots 8' dries, the cloth 7 with the front face and the spots 8' facing downwardly is pressed onto the frame 1 so that the spots 8' are against the beads A resting on the ends of the pipe sections 2. The beads A thus adhere to the spots 8', and the cloth 7 is then removed from the frame 1 and the adhesive caused to dry as described above.

Figure 5:
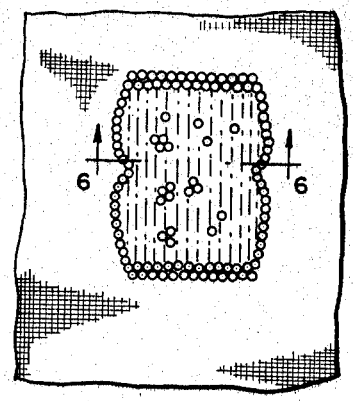
FIG. 5 is a plan view, on an enlarged scale, of a portion of the beaded cloth produced by the method of the present invention.
Figure 6:
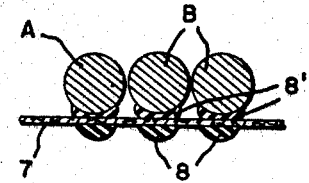
FIG. 6 is a sectional view taken on line 6—6 of FIG. 5.

There is thus produced a beaded cloth such as is shown in FIGS. 5 and 6, in which the beads A are arranged in any desired pattern on the front face of the cloth, and the beads are attached to the cloth through the spots 8' of adhesive material on the front face of the cloth and the spots 8 of adhesive material on the back face of the cloth. Because the adhesive is on both sides of the cloth, the beads are firmly secured to the cloth and will not easily come off. Moreover, because the adjacent spots are not attached to each other, flexible portions of the cloth will be present between any two adjacent spots of adhesive material. Consequently the cloth will remain flexible even though there is considerable adhesive material on it. In addition, because all of the beads in the pattern

What is claimed is:

1. A method of manufacturing beaded cloth, comprising the steps of arranging a plurality of bead holding members in a pattern of the beads to be applied to the cloth, placing beads on said bead holding members, recording the positions of the beads and transferring the recorded positions to the back face of the cloth to which the beads are to be applied, applying spots of adhesive material to the back face of the cloth to which the beads are to be attached in the pattern of recorded bead positions and drying the adhesive material transferring the recorded positions of the beads to the front face of the cloth with the positions corresponding to the spots of adhesive on the back face of the cloth, applying spots of adhesive material to the front face of the cloth in the pattern of recorded bead positions, placing the front face of the cloth with the adhesive spots downwardly against the beads in the bead holding members for securing the beads to the spots on the front face of the cloth, and drying the adhesive spots on the front face of the cloth.

2. A method as claimed in claim 1 in which the steps of recording the positions of the beads and transferring the recorded positions to the cloth comprise marking the bead positions on a transfer sheet, transferring the positions from the transfer sheet to a sheet of material, perforating the sheet of material at the recording positions, and placing the perforated sheet over the back face of the cloth and the front face of the cloth for step applying the adhesive material thereto.

3. A method as claimed in claim 2 in which the steps of applying spots of adhesive to the faces of the cloth comprise spreading a layer of adhesive over the perforated sheet and applying a force to the adhesive to force it through the perforations in the sheet onto the face of the cloth.

4. A method of manufacturing beaded cloth comprising the steps of arranging a plurality of bead holding members in a pattern of the beads to be applied to the cloth, placing beads on said bead holding member, recording the positions of the beads and transferring the recorded positions to one face of the cloth to which the beads are to be applied, applying spots of adhesive material to said one face of the cloth to which the beads are to be attached in the pattern of recorded bead positions, placing said one face of the cloth with the adhesive spots downwardly against the beads in the bead holding members for securing the beads to the spots on the cloth, and drying said adhesive spots.

5. A method as claimed in claim 4 in which the steps of recording the positions of the beads and transferring the recorded positions to the cloth comprise marking the bead positions on a transfer sheet, transferring the positions from the transfer sheet to a sheet of material, perforating the sheet of material at the recorded positions, and placing the perforated sheet over the face of the cloth to which the beads are to be applied for applying the adhesive material to the cloth through the perforations of said sheet.

References Cited

UNITED STATES PATENTS

| 2,470,963 | 5/1949 | Weyl. | |
| 2,924,455 | 2/1960 | Brunel | 161—148 |
| 3,051,600 | 8/1962 | Markus et al. | 161—94 |

MORRIS SUSSMAN, Primary Examiner

U.S. Cl. X.R.

161—37, 114, 148